J. P. DAVISON.
Potato Digger.
No. 80,611. Patented Aug. 4, 1868.
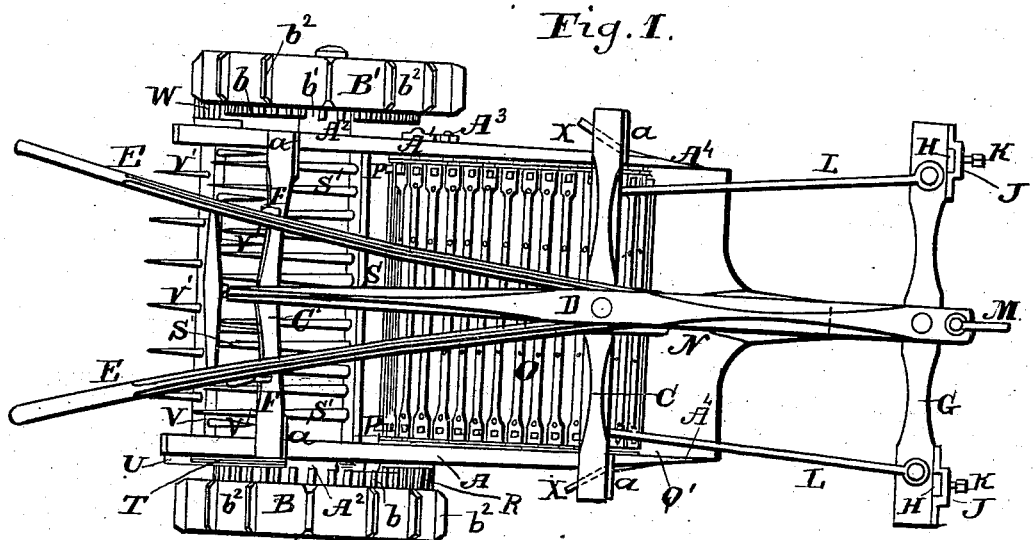
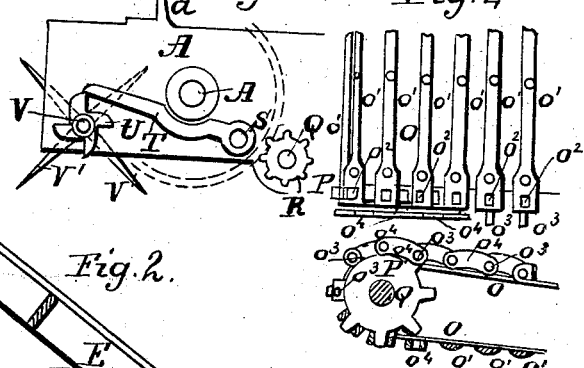
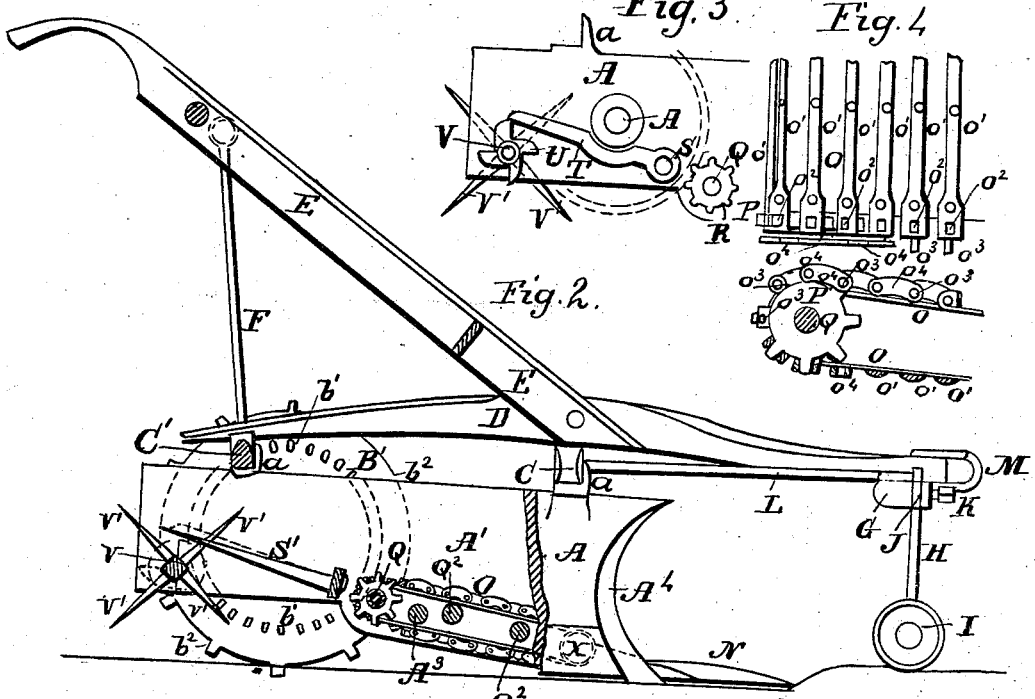

UNITED STATES PATENT OFFICE.

JAMES P. DAVISON, OF ROME, NEW YORK.

IMPROVEMENT IN POTATO-DIGGERS.

Specification forming part of Letters Patent No. 80,611, dated August 4, 1868.

*To all whom it may concern:*

Be it known that I, JAMES P. DAVISON, of Rome, in the county of Oneida and State of New York, have invented a certain new and useful Improvement in Potato-Diggers; and I do hereby declare the following to be a full, clear, and exact description of the same, reference being had to the accompanying drawings, which form part of this specification.

The object of this invention is to provide a simple and effective machine for digging potatoes and separating them from the earth, tops, &c., with which they are mixed. The potatoes, &c., are thrown up by a peculiar-shaped share or point, and passing over it are taken up by an endless apron or equivalent device and deposited on a series of vibrating arms or fingers which shake out the earth, the potatoes, &c., which remain on them being removed by a series of rotating fingers, said parts receiving their motion from a pair of driving-wheels which support the rear end of the machine. The depth of the furrow cut by the machine is regulated by two adjustable lead-wheels attached to the front end of the beam. The front ends of the sides are of a curved outline, and, being sharp, cut off the overhanging tops and weeds and cause them to pass through the machine with the potatoes and earth. Flaring wings or shields are employed to turn aside the weeds, &c., which would obstruct the driving-wheels.

In the drawings, Figure 1 represents a plan view of my improved machine; Fig. 2, a side elevation, partly in vertical section; Fig. 3, an elevation of a portion of one of the sides, showing the manner of actuating the shaking-fingers; and Fig. 4 an enlarged view of a portion of the endless apron.

A A' may represent the sides of my machine. These are of cast-iron or other suitable material, and have formed on or secured to them near their rear ends studs $A^2$, on which the driving-wheels B B' are pivoted. They have also formed on their upper edges angular flanges or lips $a$, for the reception of the ends of cross-bars C C', said lips being perforated for the passage of the bolts or screws by which said bars are united to the sides. Mounted on said bars is the draft-beam D, of ordinary construction, having attached to it the handles E, by which the machine is guided, said handles being braced by rods or stays F passing through the bar C'.

G is a bar secured to the under side of the beam D at its front end, to form bearings for the standards H of the lead-wheels I, by which the depth of the furrow cut is regulated. These standards are guided by brackets J, rigidly fastened to the front side of said bar G, and are held at any desired point by set-screws K.

L L are rods connecting the ends of the bar G to the bar C.

M is the clevis, to which the team is attached. N is the share or point by which the potatoes are dug. It is of steel or other suitable metal, of the form represented in Fig. 1, and secured between the sides A A' by bolts or other suitable means, and, with the stay-bolt $A^3$, serves to support and brace the sides at their lower edges.

O is the endless apron which I prefer to employ to convey the potatoes, dirt, &c., to the separating devices. It consists of a belt, $o$, of leather or other suitable material, having riveted transversely of it metallic bars $o'$, which are formed with square openings $o^2$ in their ends, for the reception of the teeth of the driving-pinions P, and with projections $o^3$ for the attachment of the links $o^4$, by which they are connected, and which serve to keep them a proper distance apart to mesh with the driving-pinions. This apron is stretched over the pinions P on the shaft Q and around the roller Q', and, if necessary, is further supported by rods or rollers $Q^2$, arranged within it. The shaft Q, which carries the driving-pinions P, passes through the side A, and is there provided with a pinion, R, which meshes with the teeth $b$ on the inner face of the driving-wheel B.

Pivoted in the sides A A', directly behind the apron O, is a rod, S, carrying a series of arms or fingers, S', on which the potatoes, dirt, &c., are deposited by the apron O. The rod or shaft S, passing through the side A, has rigidly attached to it an arm, T, which engages with the tappet-cam U on the rotating shaft V, thus imparting a vibrating motion to the fingers. This shaft V carries a series of radiating arms, V', corresponding with the spaces between the arms or fingers S', which remove the tops, weeds, &c., from said fingers and discharge them behind the machine. The shaft V receives its motion from the driving-wheel B' through the pinion W, which meshes with the teeth b' on the inner face of said wheel. The wheels B B' are constructed with projections $b^2$ on their peripheries, to prevent their slipping while the machine is in operation. The front edges, $A^4$, of the sides A A' present a curved outline, and are sharpened to adapt them to cut off the overhanging tops and weeds, so that they shall pass through the machine with the potatoes, dirt, &c. Projecting wings or shields X are attached to the sides near their lower edges to turn aside any obstruction which may be in the way of the driving-wheels.

A rake or other device may, when desired, be attached behind the machine to gather the potatoes.

Instead of the handles E, a seat may be mounted at the rear end of the machine; or the seat may be made removable and be suspended from or rest on said handles. I also propose substituting a series of rollers, either driven or loose, for the apron O when desired; or, instead of either, employing two or more of the shakers S S', so that the dirt shall begin to be discharged or the separation commence as soon as the potatoes, &c., pass over the point; or a series of the revolving clearers V V', arranged one behind the other, may replace and perform all the functions of the endless apron and shaker.

Having thus described my invention, what I claim as new therein, and desire to secure by Letters Patent, is—

1. The combination of the share or point N, apron O, vibrating shakers S S', and clearing-fingers V V', arranged and operating substantially as and for the purpose set forth.

2. The endless apron O, consisting of the belt o, transverse bars $o'\ o^2\ o^3$, and links $o^4$, employed and operating substantially as and for the purpose specified.

3. The lips or flanges a, in combination with the cross-bars C C' G, beam D, and braces L, substantially as described.

To the above specification of my invention I have signed my hand this 15th day of January, 1868.

JAMES P. DAVISON.

Witnesses:
   GEO. F. HODGES,
   Z. HILL.